US008265992B1

(12) United States Patent
Seshadri et al.

(10) Patent No.: US 8,265,992 B1
(45) Date of Patent: Sep. 11, 2012

(54) CHURN PREDICTION USING RELATIONSHIP STRENGTH QUANTIFICATION

(75) Inventors: Mukund Seshadri, Oakland, CA (US); Sridhar Machiraju, Burlingame, CA (US); Jean Bolot, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 390 days.

(21) Appl. No.: 12/409,853

(22) Filed: Mar. 24, 2009

(51) Int. Cl.
*G06Q 10/00* (2012.01)
*G06Q 50/00* (2012.01)
*G06N 5/02* (2006.01)

(52) U.S. Cl. ............ 705/14.19; 705/14.64; 705/304
(58) Field of Classification Search ........... 705/14, 705/14.64, 14.304, 14.11, 14.19, 343, 344, 705/346
See application file for complete search history.

(56) References Cited

U.S. PATENT DOCUMENTS

| | | | | |
|---|---|---|---|---|
| 5,822,410 | A * | 10/1998 | McCausland et al. | 379/114.01 |
| 5,907,800 | A * | 5/1999 | Johnson et al. | 455/405 |
| 6,301,471 | B1 * | 10/2001 | Dahm et al. | 455/405 |
| 6,597,903 | B1 * | 7/2003 | Dahm et al. | 455/405 |
| 6,751,295 | B2 * | 6/2004 | McCulley et al. | 379/10.01 |
| 7,340,408 | B1 * | 3/2008 | Drew et al. | 705/7.33 |
| 7,573,992 | B1 * | 8/2009 | Stark | 379/121.02 |
| 7,801,761 | B2 * | 9/2010 | Varadarajan et al. | 705/7.29 |
| 7,813,951 | B2 * | 10/2010 | Eskandari | 705/7.31 |
| 2003/0064722 | A1 * | 4/2003 | Frangione et al. | 455/424 |
| 2004/0034558 | A1 * | 2/2004 | Eskandari | 705/10 |
| 2006/0143027 | A1 * | 6/2006 | Jagannathan et al. | 705/1 |
| 2006/0259361 | A1 * | 11/2006 | Barhydt et al. | 705/14 |
| 2006/0270478 | A1 * | 11/2006 | Barhydt et al. | 463/41 |
| 2007/0127692 | A1 * | 6/2007 | Varadarajan et al. | 379/265.06 |
| 2007/0156673 | A1 * | 7/2007 | Maga et al. | 707/5 |
| 2007/0185867 | A1 * | 8/2007 | Maga et al. | 707/6 |
| 2008/0167934 | A1 * | 7/2008 | Rani et al. | 705/9 |
| 2009/0190729 | A1 * | 7/2009 | Chakraborty et al. | 379/112.01 |

OTHER PUBLICATIONS

Milgram Stanley, The Small World Problem, Psyhology Today, vol. 2, 1967.*
Birke et al, Network Structure and Consumer Interaction in Mobile Telecom 2006 https://editorialexpress.com/cgi-bin/conference/download.cgi?db_name=res2007&paper_id=324.*
Neslin et al, Defection Detection, Improving Predictive Accuracy of Customer Churn Models, 2004 http://mba.tuck.dartmouth.edu/pages/faculty/scott.neslin/defection%20detection%20paper.pdf.*
Backstrom et al, Group Formation in Large Networks, Membership, Growth, and Evolution, KDD 06, 2003 http://www.cs.cornell.edu/~dph/papers/kdd06-comm.pdf.*
Guha et al, Propagation of Trust and Distrust, New York, ACM 1 58113 844 X 04 0005, May 22, 2004 http://www.www2004.org/proceedings/docs/1p403.pdf.*

(Continued)

*Primary Examiner* — Johnna Loftis
*Assistant Examiner* — Octavian Rotaru

(57) ABSTRACT

An embodiment of the current invention is directed to determining that a wireless-service subscriber using a given mobile computing device is likely to transition to another provider ("to churn"). A list of mobile computing devices that have communicated with the given mobile computing device is determined. A relationship-strength value for each mobile computing device in the list is determined. A risk value of the given mobile computing device is determined based on the relationship-strength values of each of the mobile computing devices in the list that have churned. If the risk value is not greater than a risk value threshold, the given mobile computing device is not likely to churn. If the risk value is greater than the risk value threshold, the given mobile computing device is likely to churn.

17 Claims, 6 Drawing Sheets

OTHER PUBLICATIONS

Mozer et al, Predicting Subscriber Dissatisfaction and Improving Retention in the Wireless Telecommunications Industry, Athene Software, IEEE, 2000 http://ieeexplore.ieee.org/stamp/stamp.jsp?arnumber=00846740.*

Burt et al, Explorations in Economic Sociology, ISBN 0871548402, 1993.pdf.*

Au et al, A Novel Evolutionary Data Mining Algorithm with Applications to Churn Predictions, IEEE, vol. 7, No. 6, Dec. 2003 http://ieeexplore.ieee.org/stamp/stamp.jsp?arnumber=01255389.*

Goldberg et al, Talk of the Network, a complex systems look at the Underlying Process of Word of mouth, Kluwer Publishers, Netherlands 2001 http://www.complexmarkets.com/files/TalkofNetworks.pdf.*

Travers et al, An Experimental Study of the Small World Problem, Sociometry, vol. 32, No. 4, 1969 http://www.cis.upenn.edu/~mkearns/teaching/NetworkedLife/travers_milgram.pdf.*

WEKA Explorer User Guide version 355 , 2007 http://www.cse.yorku.ca/course_archive/2006-07/W/4412/doc/weka/ExperimenterTutorial-3.5.5.pdf.*

Ziegler et al, Spreading Activation Models for Trust Propagation, proceedings of the IEEE International Conf on e-tech, e-commerce and e-service, 2004.*

Seshadri et al, Mobile Call Graphs—Beyound Power-Law and Log-normal Distributions, KDD, Las Vegas, Aug. 2008.*

* cited by examiner

CHURN PREDICTION USING RELATIONSHIP STRENGTH QUANTIFICATION

SUMMARY

Embodiments of the invention are defined by the claims below, not this summary. A high-level overview of various aspects of the invention is provided here for that reason, to provide an overview of the disclosure, and to introduce a selection of concepts that are further described below. This summary is not intended to identify key features or essential features of the claimed subject matter, nor is it intended to be used as an aid in isolation to determine the scope of the claimed subject matter.

Embodiments of the present invention are related to determining that a wireless-service subscriber using a given mobile computing device is likely to transition to another provider ("to churn"). A list of one or more mobile computing devices that have communicated with the given mobile computing device are determined. A relationship-strength value for each mobile computing device in the list is determined, where the relationship-strength value is based on the number of calls between each of the mobile computing devices in the list and the given mobile computing device. The relationship-strength value for each of the mobile computing devices in the list is set to a predetermined value if the number of calls from the mobile computing device in the list to the given mobile computing device is less than a threshold relationship-strength value.

A risk value of the given mobile computing device is determined based on the relationship-strength values of each of the mobile computing devices in the list that have churned. If the risk value is not greater than a risk value threshold, the given mobile computing device is not likely to churn. If the risk value is greater than the risk value threshold, the given mobile computing device is likely to churn. According to some embodiments of the invention, an incentive is determined to be provided to mobile computing devices that are likely to churn.

BRIEF DESCRIPTION OF THE DRAWINGS

Illustrative embodiments of the present invention are described in detail below with reference to the attached drawing figures, and wherein.

DETAILED DESCRIPTION

Figure 1:
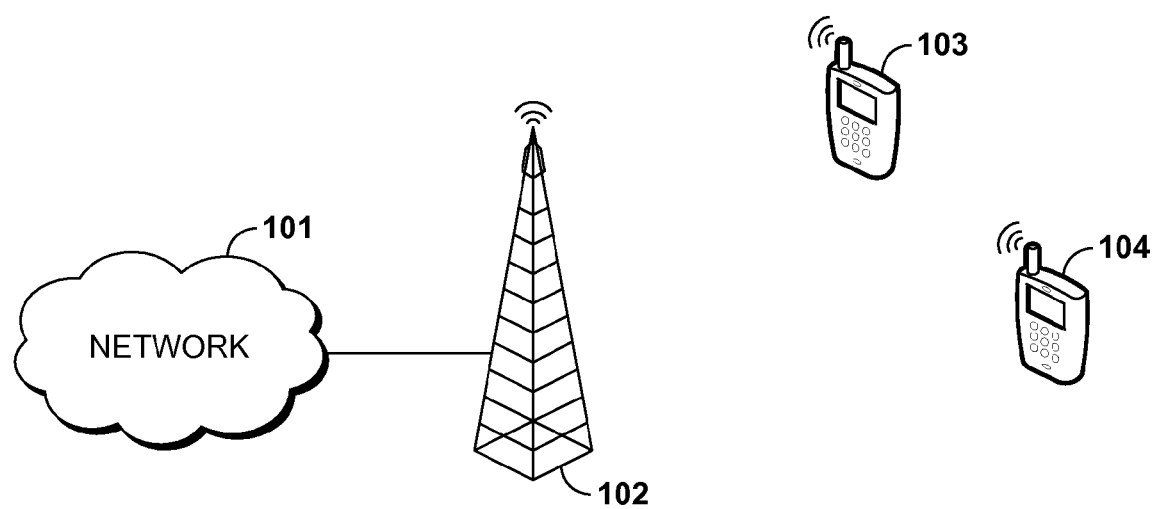
FIG. 1 depicts a block diagram of an exemplary network environment suitable for implementing an embodiment of the invention.

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention are directed to, among other things, determining that a wireless-service subscriber, or a group of wireless-service subscribers are likely to change service provides (i.e., to churn). Users of mobile computing devices connect to network resources through the use of base stations. Base stations can be maintained by wireless-service providers. Wireless-service providers can charge fees for the use of their base stations. Users who utilize a particular wireless-service provider for access to network resources are subscribers of that wireless-service provider. Wireless-service subscribers that leave a particular wireless-service provider can be said to have churned. Churn can be prevented by identifying subscribers that are likely to churn and presenting them with incentives to maintain their subscriptions.

Wireless-service subscribers can have influence over other subscribers of the same service provider. By way of example, a subscriber with many friends may have influence over each of their friends choice of wireless-service provider. If the subscriber cancels their contract with a particular wireless-service provider, it may be likely that each of their friends will also cancel their respective contracts with the wireless-service provider.

According to an embodiment of the invention, a risk is determined for each of a number of wireless-service subscribers. Any wireless-service subscriber with a risk value above a threshold risk value can be said to be likely to churn. The risk value of a particular mobile computing device could be determined as the combination of relationship-strength values for the particular mobile computing device and each mobile computing device that has churned that is in a relationship with the particular mobile computing device.

Determining whether two mobile computing devices are in a relationship could be accomplished through the use of call logs, according to an embodiment of the invention. For example, a call log for a particular mobile computing device could list each call involving the particular mobile computing device, including incoming calls and outgoing calls. A number of communication types could be included as calls in the calculation of the relationship-strength value for a pair of mobile computing devices. For example, voice calls, text messages, multimedia messages (e.g., picture messages and video messages), and other data transfers (e.g., email) could be included as calls.

The relationship-strength value for a pair of mobile computing devices could be determined in a number of ways. According to an embodiment of the invention, the relationship-strength value for a mobile computing device "A" with respect to a mobile computing device "B" could be determined by counting the total number of calls involving mobile computing device "A" (total calls) and the number of calls involving both mobile computing device "A" and mobile computing device "B" (calls between A and B). The relationship-strength value could be determined as the ratio of calls between A and B to the total calls.

According to another embodiment of the invention, the relationship-strength value for a mobile computing device "A" with respect to a mobile computing device "B" could be determined by counting the number of calls per day involving both mobile computing device "A" and mobile computing device "B" for each day in a time period. For example, the time period could be one month. For each, a day value could be set to 1 if the number of calls per day involving mobile computing device "A" and mobile computing device "B" is above a call threshold and 0 otherwise. Each day value could then be summed to produce a relationship-strength value.

An embodiment of the invention is directed to identifying a first set of wireless-services subscribers who are more likely to transition to another provider ("to churn") than are those of a second set of wireless-services subscribers, wherein both of said first and second sets of wireless-services subscribers subscribe to services of the same provider. For each mobile computing device in a given set of mobile computing devices, what other mobile computing devices it has communicated with is determined, thereby resulting in an identification of a plurality of mobile-device pairs. Based on the number of communications involved in each mobile-device pair, a relationship-strength value is determined that quantifies a strength of a relationship between the paired mobile computing devices. The relationship-strength value for each pair is set to a predetermined value if the number of calls from the mobile computing device in the list to the given mobile computing device is less than a threshold value. A risk value for each mobile computing device in the given set is determined, based on the relationship-strength values of each pair of the plurality of mobile computing devices containing each mobile computing device and a mobile computing device that has churned. The first set of mobile computing devices that are likely to churn is determined by adding each mobile computing device to the first set of mobile computing devices that are likely to churn if the risk value of each mobile computing device is greater than a threshold risk value.

Another embodiment of the invention is directed to determining that a wireless-service subscriber using a given mobile computing device is likely to transition to another provider ("to churn"). A list of one or more mobile computing devices that have communicated with the given mobile computing device is determined. A relationship-strength value for each mobile computing device in the list is determined, where the relationship-strength value is based on the number of calls between each of the mobile computing devices in the list and the given mobile computing device. The relationship-strength value for each of the mobile computing devices in the list is set to a predetermined value if the number of calls from the mobile computing device in the list to the given mobile computing device is less than a threshold relationship-strength value. A risk value of the given mobile computing device is determined based on the relationship-strength values of each of the mobile computing devices in the list that have churned. If the risk value is not greater than a risk value threshold, the given mobile computing device is not likely to churn. If the risk value is greater than the risk value threshold, the given mobile computing device is likely to churn.

A further embodiment of the invention is directed to determining an incentive to provide a wireless-service subscriber using a given mobile computing device that is likely to transition to another provider ("to churn"). A list of mobile computing devices that have communicated with the given mobile computing device is determined, where the communication includes voice calls, text messages, and picture messages. A relationship-strength value for each of the mobile computing devices in the list is determined, where the relationship-strength value is based on a number of calls from a mobile computing device in the list to the given mobile computing device divided by a total number of calls involving the given mobile computing device. The relationship-strength value for each of the mobile computing devices in the list is set to a predetermined value if the number of calls from the mobile computing device in the list to the given mobile computing device is less than a threshold relationship-strength value. A risk value of the given mobile computing device is determined based on the relationship-strength values of each of the mobile computing devices in the list that have churned, where the risk value includes the sum of the relationship-strength values of each of the mobile computing devices in the list that have churned. If the risk value is not greater than a risk value threshold, it is determined that the given mobile computing device is not likely to churn. If the risk value is greater than the risk value threshold, it is determined that the given mobile computing device is likely to churn and an incentive to provide to the user of the given mobile computing device is determined, thereby, when the incentive is provided, decreasing the likelihood that the user will churn.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Having briefly described an overview of embodiments of the present invention, an exemplary operating environment in which embodiments of the present invention may be implemented is described below in order to provide a general context for various aspects of the present invention. In particular, an exemplary operating environment for implementing embodiments of the present invention could be generally referred to as a computing device. The invention may be practiced in a variety of computing device configurations, including handheld devices, consumer electronics, general-purpose computers, mobile computing devices, wireless computing devices, mobile phones, and more specialty computing devices. The invention may also be practiced in distributed computing environments where tasks are performed by remote-processing devices that are linked through a communications network.

Computing devices can include a number of components, such as memory, one or more processors, one or more presentation components, input/output (I/O) ports, I/O components, and one or more networking interfaces. Computing devices can include a variety of computer-readable media. Computer-readable media can be any available media that can be accessed by a computing device and include both volatile and nonvolatile media, removable and nonremovable media.

Turning now to FIG. 1, a diagram depicting a network environment suitable for implementing the present invention is given. A number of mobile computing devices 103 and 104, which are computing devices with wireless networking ability, use a base station 102 as a point of connection to network resources 101. There are a number of devices suitable for use as base station 102. By way of example, a cellular tower with one or more carriers could be a base station 102. An IEEE 802.11 compatible base station could also be used as base station 102. A base station 102 can be owned and maintained by a wireless-service provider. Each of the mobile computing devices 103 and 104 could have service contracts with the wireless-service provider maintaining base station 102 allowing them to use the base station 102 as a point of connection to the network 101. These mobile computing devices 103 and 104 could be wireless-service subscribers. The network 101 could be the Internet. The network 101 could also be a private intranet.

Figure 2:
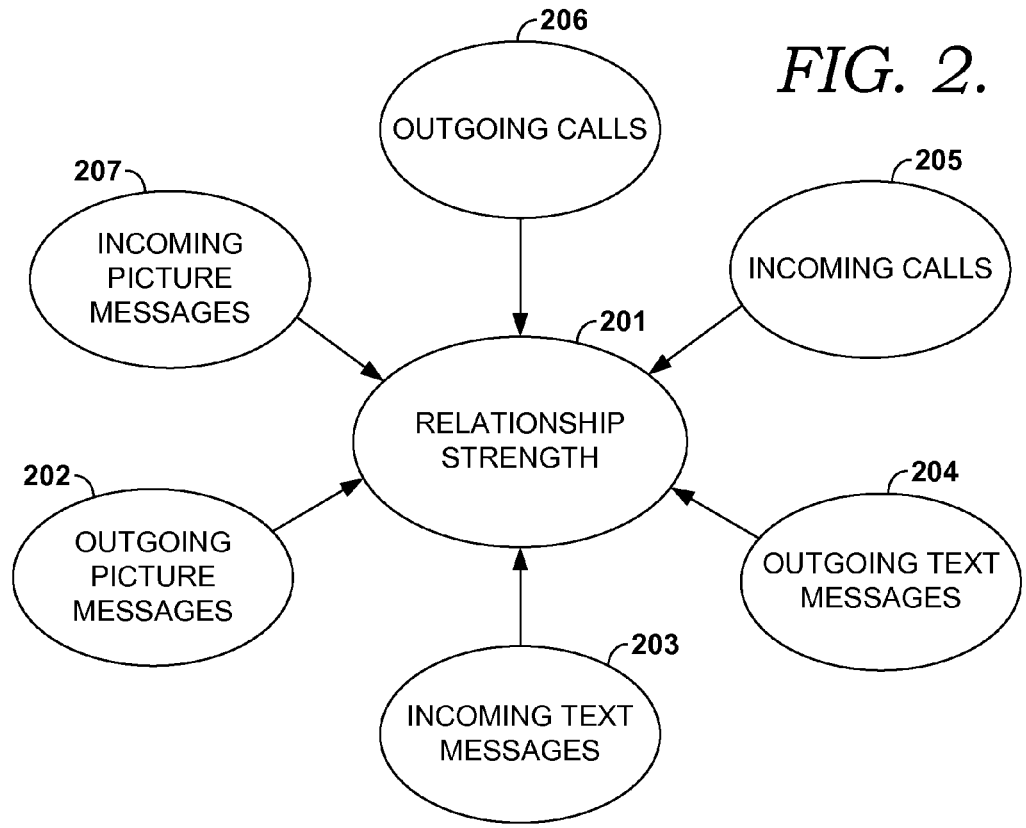
FIG. 2 depicts a diagram of some components that may be used in determining a relationship-strength value, in accordance with an embodiment of the invention.

Turning now to FIG. 2, the strength of the relationship between two mobile computing devices can be determined based on a number of factors. For example to determine the relationship-strength value 201 for a mobile computing device "A" with respect to a mobile computing device "B," a number of outgoing calls 206 from mobile computing device "A" to mobile computing device "B" and a number of incoming calls 205 from mobile computing device "B" to mobile computing device "A" could be included. Similarly, a number of outgoing text messages 204 and a number of incoming text messages 203 could be included. A number of incoming picture messages 207 and a number of outgoing picture messages 202 could be included. There are many other forms of data communications that could be included under the general term "calls."

Figure 3:
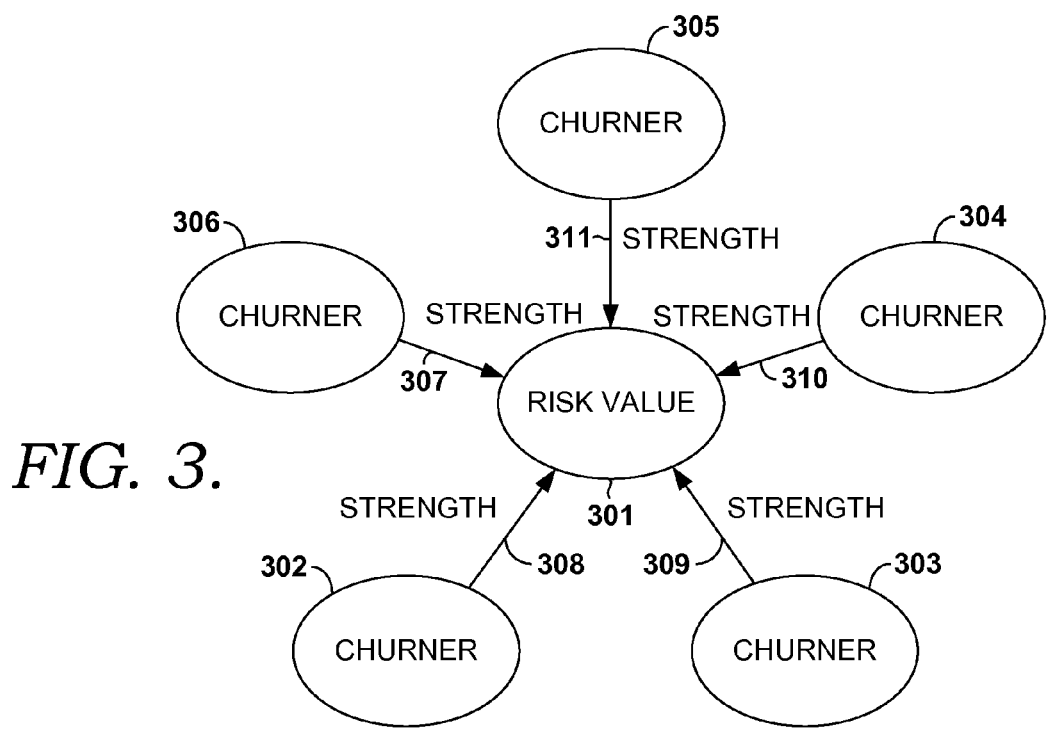
FIG. 3 depicts a diagram of some components that may be used in determining a risk value, in accordance with an embodiment of the invention.

Turning now to FIG. 3, a risk value 301 for a particular mobile computing device could be determined by combining relationship-strength values 307-311 for the relationships between the particular mobile computing device and a number of mobile computing devices that have been known to churn 302-306. There are a number of ways the relationship-strength values 307-311 could be combined to create a risk value 301. By way of example, the relationship-strength values 307-311 could be summed to create the risk value 301. As another example, the number of nonzero relationship-strength values could be counted to create the risk value 301.

Figure 4:
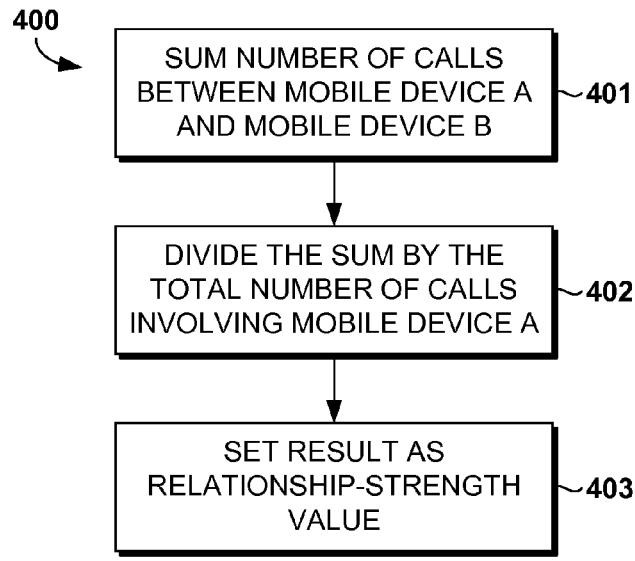
FIG. 4 is a flow diagram showing a method of determining a relationship-strength value, in accordance with an embodiment of the invention.

Referring to FIG. 4, a flow diagram depicting a method 400 of determining a relationship-strength value is given. The number of calls between a mobile computing device "A" and a mobile computing device "B" are summed, as shown at block 401. According to an embodiment of the invention, the number of calls could include voice calls, text messages, multimedia messages (e.g., picture messages and video messages), and other data transfers (e.g., email messages). The number of calls could be the number of calls over a given time period. By way of example, the time period could be a month.

The sum is divided by the total number of calls involving mobile computing device "A," as shown at block 402. The number of calls can include many different types of data transfers. The resulting ratio is set as the relationship-strength value, as shown at block 403. There are a number of different additional factors that could be used to modify the ratio. By way of example, the average call duration of voice calls could be used to modify the ratio that is set as the relationship-strength value.

Figure 5:
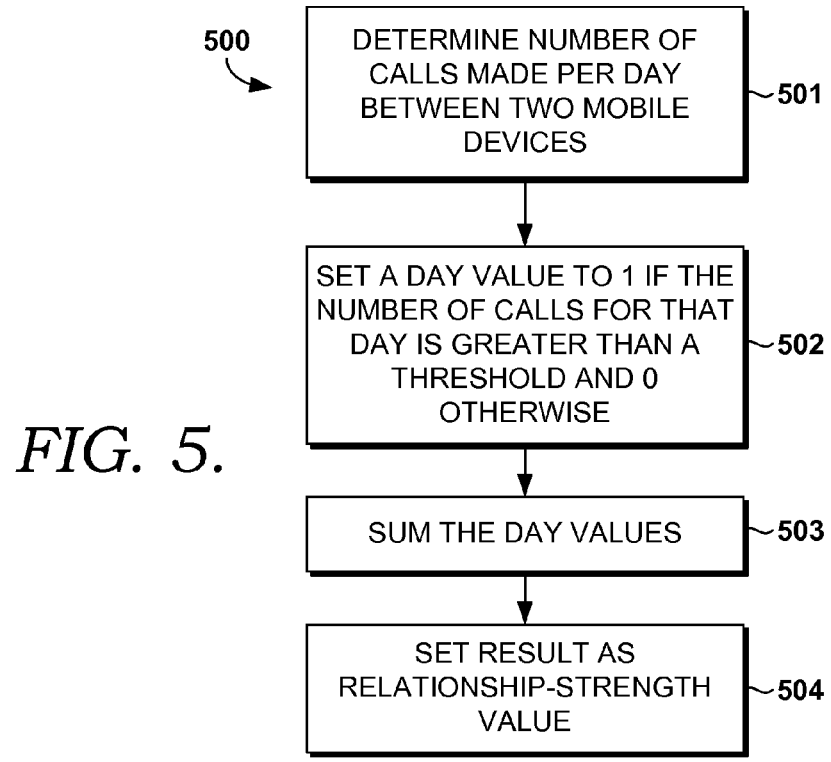
FIG. 5 is a flow diagram showing a method of determining a relationship-strength value, in accordance with an embodiment of the invention.

Turning now to FIG. 5, a flow diagram depicting a method 500 of determining a relationship-strength value is given. A number of calls per day involving a mobile computing device "A" and a mobile computing device "B" is determined, as shown at block 501. The number of calls per day for a given time period could be used. For example, the number of calls per day for a month could be used.

A day value for each day in the time period is set to 1 if the number of calls corresponding to that particular day is greater than a threshold number of calls; otherwise the day value for that particular day is set to 0, as shown at block 502. The threshold number of calls could be determined in a number of ways. For example, the threshold number could be determined experimentally by using historical data and attempting to predict which subscribers will churn by using different values of the threshold number.

The day values for each day in the time period are summed, as shown at block 503, and the result is set as the relationship-strength value, as shown at block 504. A number of different factors could be used to modify the sum set as the relationship-strength value. For example, the total number of calls per day involving mobile computing device "A" could be used to modify the day values used to determine the relationship-strength values.

Figure 6:
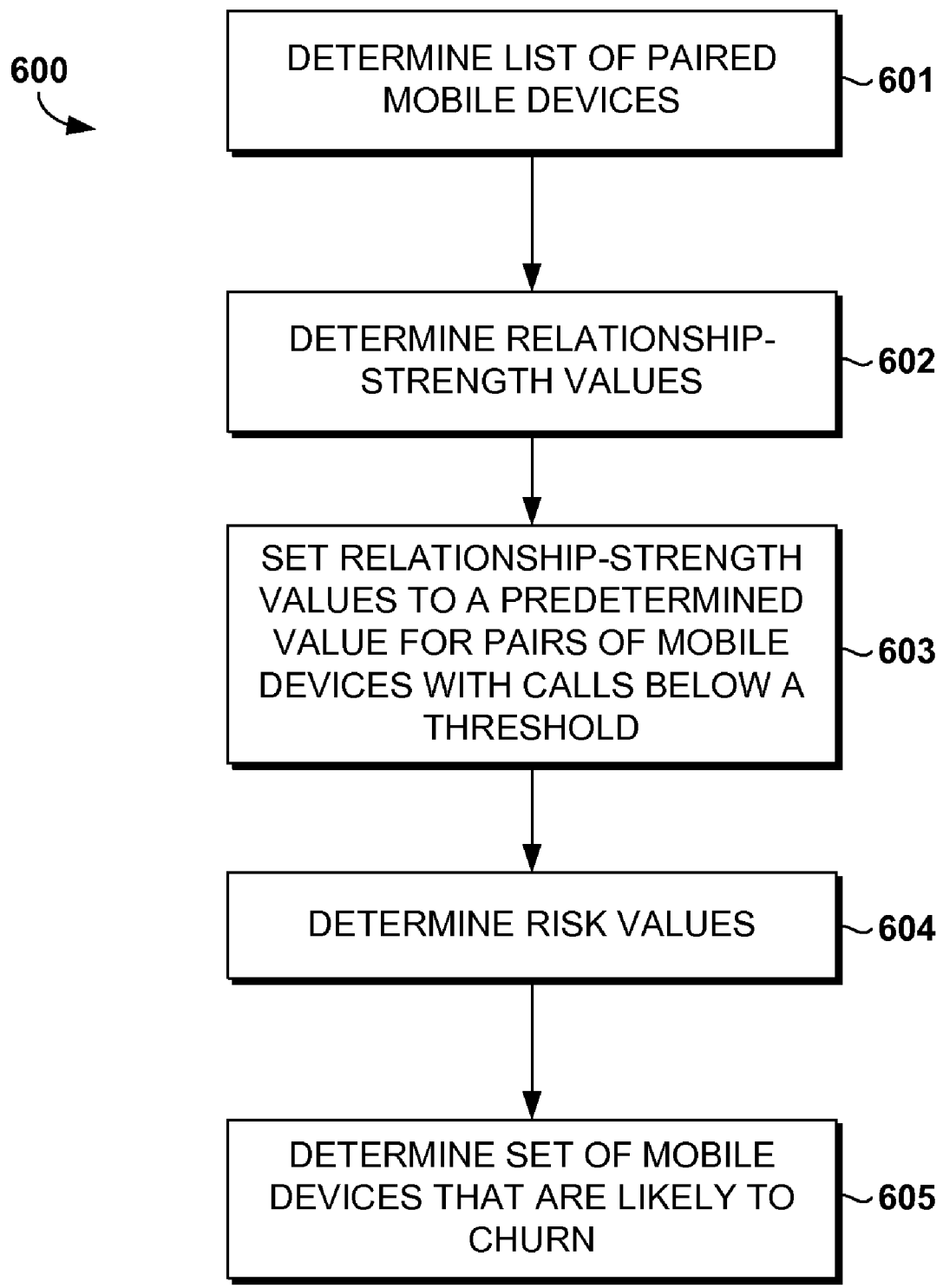
FIG. 6 is a flow diagram showing a method of determining a set of mobile computing devices that are likely to churn, in accordance with an embodiment of the invention.

Turning now to FIG. 6, a flow diagram depicting a method 600 of determining a set of mobile computing devices that are likely to churn is given. A list of paired mobile computing devices is determined as shown at block 601. According to an embodiment of the invention, for each mobile computing device in a list of mobile computing devices, it could be determined what other mobile computing devices each mobile computing device has communicated with, thereby creating a list of pairs of mobile computing devices.

Relationship-strength values for each of the pairs of mobile computing devices is determined, as shown at block 602. There are a number of ways the relationship-strength values could be determined according to embodiments of the invention. By way of example, method 400 of FIG. 4 could be used to determine the relationship-strength values. As another example, method 500 of FIG. 5 could be used to determine the relationship-strength values.

Each relationship-strength value for pairs of nodes with a number of calls between them below a threshold value is set to a predetermined value, as shown at block 603. According to an embodiment of the invention, relationship-strength values below a threshold value could be set to zero. The threshold value could be determined in a number of ways. For example, the threshold value could be determined experimentally, based on historical data. As a further example, the threshold value could be set to five calls.

Risk values for each of the mobile computing devices is determined, as shown at block 604. Risk values can be determined in a number of ways, in accordance with embodiments of the invention. For example, the sum of relationship-strength values involving a particular mobile computing device and any mobile computing device that has previously churned could be summed and set as the risk value of the particular mobile computing device. A set of mobile computing devices that are likely to churn is determined, as shown at block 605. By way of example, the set of mobile computing devices that are likely to churn could be determined by adding to the set any mobile computing device whose risk value is above a threshold risk value. As another example a list of all mobile computing devices could be presented, ordered by their risk values.

Figure 7:
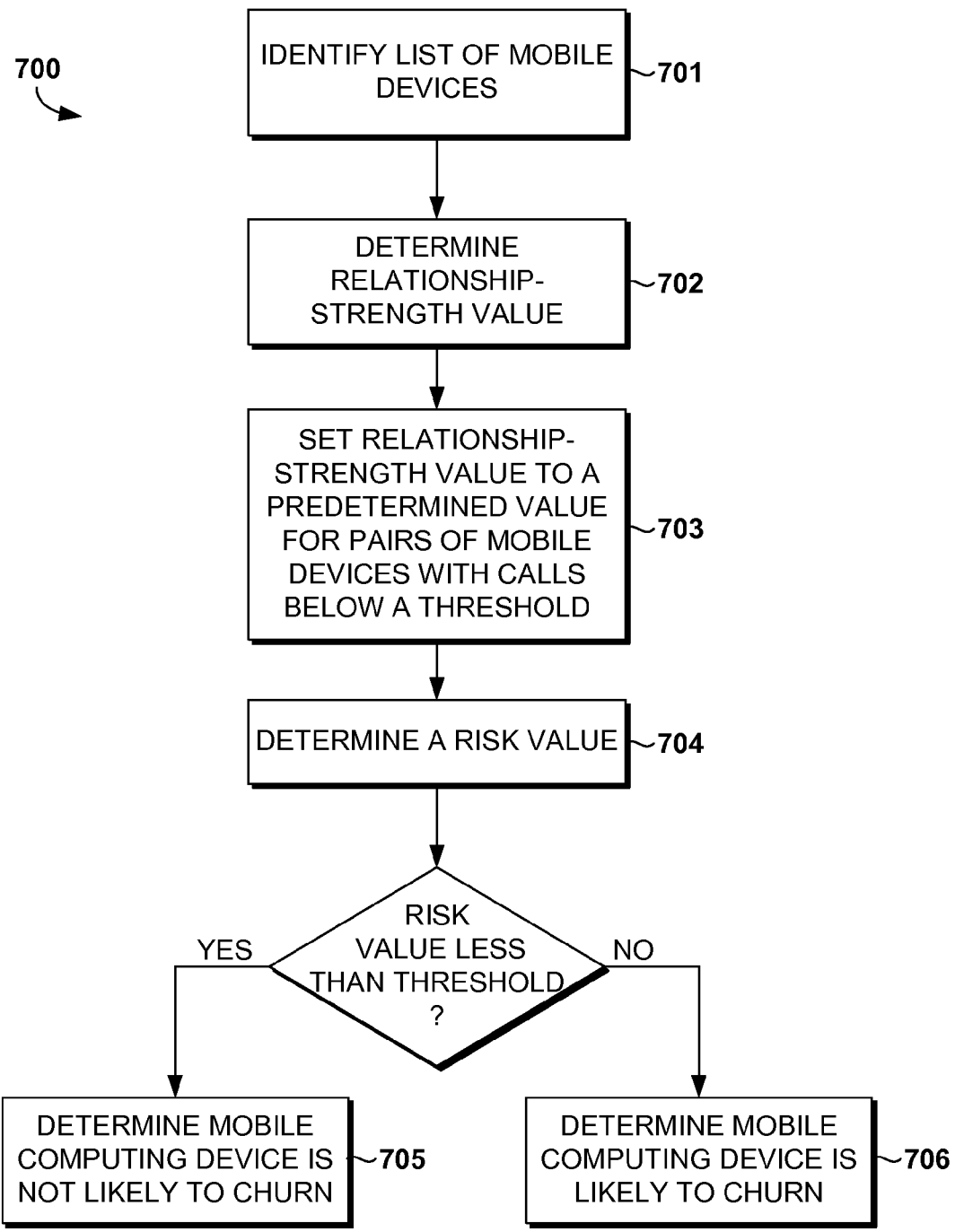
FIG. 7 is a flow diagram showing a method of determining a mobile computing device is likely to churn, in accordance with an embodiment of the invention.

Turning now to FIG. 7, a flow diagram depicting a method 700 of determining that a given mobile computing device is likely to churn is given. A list of mobile computing devices is determined as a list of mobile computing devices that have been involved in communication with the given mobile computing device over a time period, as shown at block 701. There are a number of ways that the list of mobile computing devices could be determined. By way of example, the list could be determined from a log of subscriber activity maintained by a wireless-service provider. Relationship-strength values are determined for each mobile computing device in the list, as shown at block 702. There are a number of ways to determine the relationship-strength values, in accordance with embodiments of the invention. For example, method 400 of FIG. 4 could be used. As another example, method 500 of FIG. 5 could be used.

The relationship-strength values are set to a predetermined value if the number of calls between the pair of mobile computing devices is below a certain threshold, as shown at block 703. By way of example, any relationship-strength value that is below five calls could be set to zero. There are other values of the predetermined value and the threshold that could be used in accordance with embodiments of the invention. A risk value for the given mobile computing device is determined based on the relationship-strength values, as shown at block 704. By way of example, the relationship-strength values involving mobile computing devices that have churned could be summed and the result set as the risk value for the given mobile computing device.

If the risk value is less than a threshold value, the given mobile computing device is determined to not be likely to churn, as shown at block 705. If the risk value is not less than a threshold value, the given mobile computing device is determined to be likely to churn, as shown at block 706.

Figure 8:
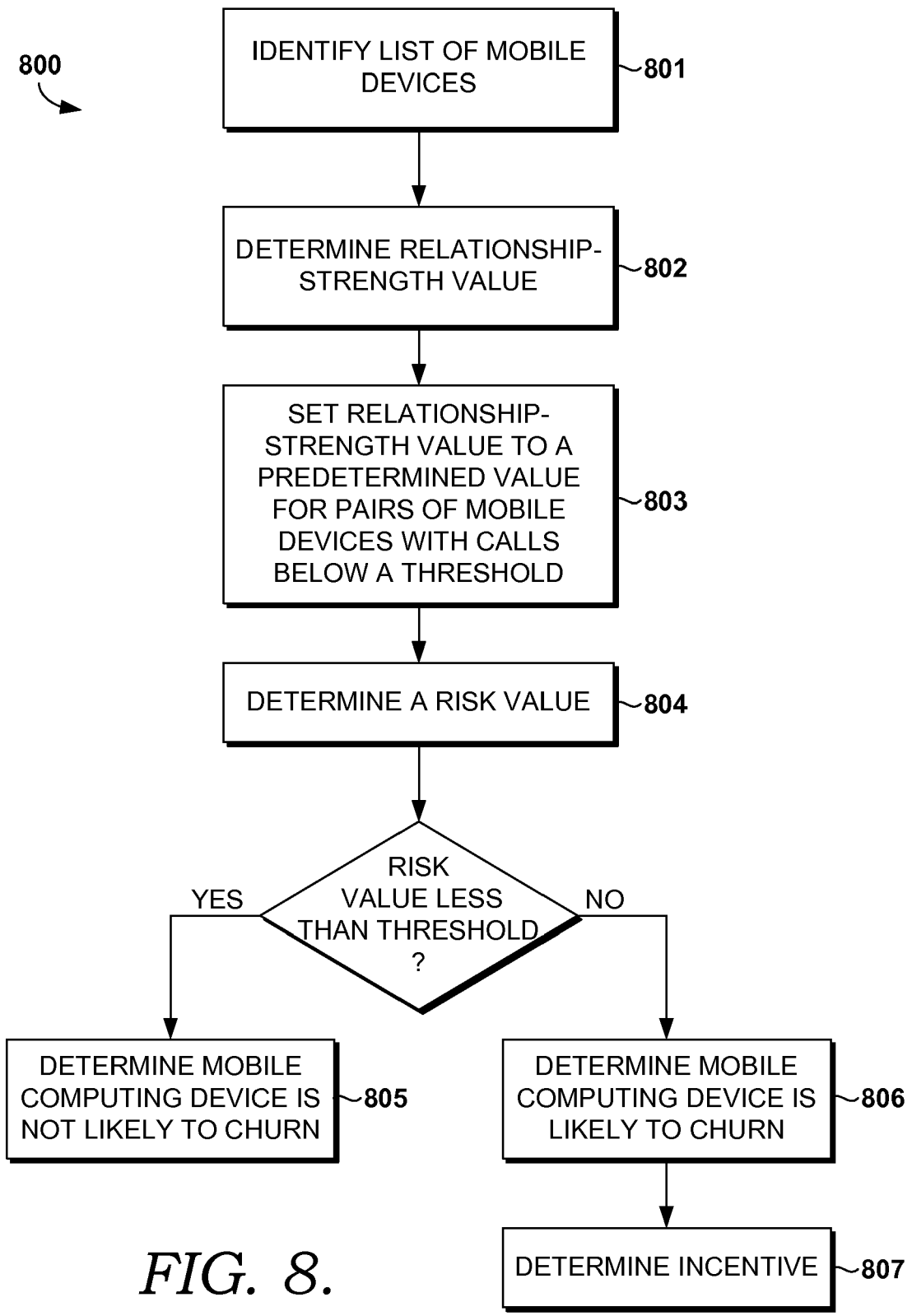
FIG. 8 is a flow diagram showing a method of determining an incentive to provide a subscriber using a mobile computing device that is likely to churn, in accordance with an embodiment of the invention.

Turning now to FIG. 8, a flow diagram depicting a method 800 of determining an incentive to provide a user of a given mobile computing device that is labeled likely to churn is given. A list of mobile computing devices that have communicated with the given mobile computing device over a time period is identified, as shown at block 801, similar to block 701 of FIG. 7. Relationship-strength values for each of the mobile computing devices in the list are determined, as shown at block 802, similar to block 702 of FIG. 7. According to an embodiment, relationship-strength values for pairs of mobile devices with a number of calls between them that is below a threshold value are set to a predetermined value, as shown at block 803, similar to block 703 of FIG. 7. According to another embodiment, Relationship-strength values that are below a threshold value are set to a predetermined value.

A risk value for the given mobile computing device is determined, as shown at block 804, similar to block 704 of FIG. 7. If the risk value is less than a threshold risk value, the given mobile computing device is labeled not likely to churn, as shown at block 805, similar to block 705 of FIG. 7. If the risk value is not less than a threshold risk value, label the given mobile computing device likely to churn, as shown at block 806, similar to block 706 of FIG. 7, and determine an incentive to provide to the user of the given mobile computing device, as shown at block 807. An incentive could be something used to reduce the likelihood that the user of the given mobile computing device will in fact churn, in accordance with embodiments of the invention. By way of example, an incentive could be a discount on a new mobile computing device. As another example, an incentive could be free service for a period of time. There are many other possible incentives suitable for use with the invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media having computer-executable instructions embodied thereon that, when executed, enable a computing device to perform a method of identifying a first set of wireless-services subscribers who are more likely to transition to another provider ("churn") than are those of a second set of wireless-services subscribers, wherein both of said first and second sets of wireless-service subscribers subscribe to services of the same provider, the method comprising:

for each mobile computing device in a given set of mobile computing devices, determining what other mobile computing devices it has communicated with, thereby resulting in an identification of a plurality of mobile-device pairs, each pair being made up of said each mobile computing device and another mobile computing device;

counting a number of communications involved in each mobile-device pair, thereby providing a sum of the number of communications involved in each mobile-device pair;

determining whether the sum of the number of communications involved in each mobile-device pair is greater than or less than a threshold number of calls;

for each mobile-device pair, when the sum of the number of communications involved is greater than the threshold number of calls, then calculating a relationship-strength value that is based at least on a ratio of the sum of the number of communications involved in the mobile-device pair and a total number of communications involving said mobile computing device, wherein the relationship-strength value quantifies a strength of a relationship between the mobile computing devices in the pair;

for each mobile-device pair, when the sum of the number of communications involved is less than the threshold number of calls, then setting the relationship-strength value for said each pair to a predetermined value that is the same for each pair having the sum of the number of communications less than the threshold number of calls;

determining a risk value for said each mobile computing device in the given set based on the relationship-strength values of each pair of the plurality of mobile computing devices containing said each mobile computing device and a mobile computing device that has churned; and determining the first set of mobile computing devices that are likely to churn by adding said each mobile computing device to the first set of mobile computing devices that are likely to churn when the risk value of each said mobile computing device is greater than a threshold risk value.

2. The media of claim 1, wherein determining what other mobile computing devices it has communicated with includes determining what other mobile computing devices have initiated communication sessions with said each mobile computing device.

3. The media of claim 2, wherein determining what other mobile computing devices it has communicated with includes determining what other mobile computing devices said each mobile computing device has initiated communication with.

4. The media of claim 3, wherein communication includes one or more of voice calls, text messages, and multimedia messages.

5. The media of claim 1, wherein calls include text messages.

6. The media of claim 5, wherein calls further include picture messages.

7. The media of claim 1, wherein said predetermined value is zero.

8. The media of claim 1, wherein determining the risk value includes summing the relationship-strength values of each pair of the plurality of mobile computing devices containing said each mobile computing device and a mobile computing device that has churned.

9. Computer-readable media having computer-executable instructions embodied thereon that, when executed, enable a computing device to perform a method of determining that a wireless-service subscriber using a given mobile computing device is likely to transition to another provider ("churn"), the method comprising:
   identifying a list of one or more mobile computing devices that have communicated with the given mobile computing device;
   for each of the mobile computing devices in the list, counting a number of calls between the mobile computing device in the list and the given mobile computing device, thereby providing, for each of the mobile computing devices in the list, a sum of the number of calls between the mobile computing device in the list and the given mobile computing device;
   determining a relationship-strength value for each of the one or more mobile computing devices in the list, said relationship-strength value based on the sum of the number of calls between each of the mobile computing devices in the list and the given mobile computing device;
   setting the relationship-strength value for each of the mobile computing devices in the list to a predetermined value when the sum of the number of calls is less than a threshold number of calls, and wherein the predetermined value is the same for each mobile device in the list having the sum of the number of communications less than the threshold number of calls;
   determining a risk value of the given mobile computing device based on the relationship-strength values of each of the mobile computing devices in the list that have churned;
   when the risk value is not greater than a risk value threshold, determining that the given mobile computing device is not likely to churn; and
   when the risk value is greater than the risk value threshold, determining that the given mobile computing device is likely to churn.

10. The media of claim 9, wherein the relationship-strength value for each of the one or more mobile computing devices in the list includes a number of calls from a mobile computing device in the list to the given mobile computing device divided by a total number of calls involving the given mobile computing device.

11. The media of claim 9, wherein determining the relationship-strength value for each of the one or more mobile computing devices in the list includes:
   for each day of a time period that includes a plurality of days,
      (A) counting a number of calls from a first mobile computing device in a mobile-device pair to a second mobile computing device in the mobile-device pair, and
      (B) comparing the number of calls to a threshold daily number of calls;
   setting a day value for each day of the period of time, wherein the day value is one for each day in which the number of calls is greater than the threshold daily number of calls and zero otherwise; and
   setting the relationship-strength value for the mobile-device pair to the sum of the day values for each day in the period of time.

12. The media of claim 11, wherein the period of time is one month.

13. The media of claim 9, wherein the predetermined value is zero.

14. The media of claim 9, wherein determining the risk value includes summing the relationship-strength values of each of the mobile computing devices in the list that have churned.

15. Computer-readable media having computer-executable instructions embodied thereon that, when executed, enable a computing device to perform a method of determining an incentive to provide a wireless-service subscriber using a given mobile computing device that is likely to transition to another provider ("churn"), the method comprising:
   identifying a list of one or more mobile computing devices that have communicated with the given mobile computing device, said communication including voice calls, text messages, and picture messages;
   for each of the one or more mobile computing devices in the list, counting a number of calls between a mobile computing device in the list and the given mobile computing device, thereby providing a sum of the calls between the mobile computing device in the list and the given mobile computing device;
   determining a relationship-strength value for each of the one or more mobile computing devices in the list, said relationship-strength value based on the sum of calls between a mobile computing device in the list and the given mobile computing device divided by a total number of calls involving the given mobile computing device, wherein the relationship-strength value for each of the mobile computing devices in the list is set to a predetermined value when the sum of calls is less than a threshold number of calls, and wherein the predetermined value is the same for each mobile device in the list having the sum of the number of communications less than the threshold number of calls;
   determining a risk value of the given mobile computing device based on the relationship-strength values of each of the mobile computing devices in the list that have churned, said risk value including the sum of the relationship-strength values of each of the mobile computing devices in the list that have churned;
   if the risk value is not greater than a risk value threshold, determining that the given mobile computing device is not likely to churn; and
   if the risk value is greater than the risk value threshold,
      (A) determining that the given mobile computing device is likely to churn and
      (B) determining an incentive to provide to the user of the given mobile computing device, thereby, when said incentive is provided, decreasing the likelihood that the user will churn.

16. The media of claim 15, wherein the number of calls includes a number of voice calls, text messages, and picture messages.

17. The media of claim 15, wherein the predetermined value is zero.

* * * * *